(12) United States Patent
Newcombe et al.

(10) Patent No.: US 7,685,416 B2
(45) Date of Patent: Mar. 23, 2010

(54) ENABLING CONTENT SECURITY IN A DISTRIBUTED SYSTEM

(75) Inventors: Christopher Richard Newcombe, Kirkland, WA (US); Paul David Jones, Renton, WA (US); Richard Donald Ellis, Carnation, WA (US); Derrick Jason Birum, Duvall, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 11/737,677

(22) Filed: Apr. 19, 2007

(65) Prior Publication Data

US 2007/0289026 A1 Dec. 13, 2007

Related U.S. Application Data

(63) Continuation of application No. 10/318,350, filed on Dec. 11, 2002, now Pat. No. 7,243,226.

(60) Provisional application No. 60/341,079, filed on Dec. 12, 2001.

(51) Int. Cl.
*G06F 21/00* (2006.01)

(52) U.S. Cl. .................. 713/155; 709/225; 709/226; 380/229; 705/67

(58) Field of Classification Search ................ 713/155; 709/225, 226; 380/229; 705/67
See application file for complete search history.

(56) References Cited

U.S. PATENT DOCUMENTS

| | | | |
|---|---|---|---|
| 4,310,720 A | 1/1982 | Check, Jr. | |
| 4,920,487 A | 4/1990 | Baffes | |
| 4,999,766 A | 3/1991 | Peters et al. | |
| 5,305,389 A | 4/1994 | Palmer | |
| 5,325,526 A | 6/1994 | Cameron et al. | |
| 5,343,526 A | 8/1994 | Lassers | |
| 5,349,643 A | 9/1994 | Cox et al. | |
| 5,495,533 A | 2/1996 | Linehan et al. | |
| 5,535,276 A | 7/1996 | Ganesan | |

(Continued)

FOREIGN PATENT DOCUMENTS

EP 0841615 5/1998

(Continued)

OTHER PUBLICATIONS

Microsoft Corporation, Microsoft Windows 2000 Server Operating System, "Windows 2000 Kerberos Authentication," White Paper, 46 pages (1999).

(Continued)

*Primary Examiner*—Kambiz Zand
*Assistant Examiner*—Roderick Tolentino
(74) *Attorney, Agent, or Firm*—Darby & Darby PC; John W. Branch

(57) ABSTRACT

A method and system are directed towards enabling content security in a distributed environment. The system includes a data store for content associated with an application that may be tagged as exclusively memory resident at a client. The content may also be encrypted and digitally signed. When an authenticated client requests the content, it is provided at a constrained rate that enables a portion of the content to start execution on the client before the application associated with the content is completely downloaded. Additional portions of the content are provided to the client when the additional portions are required for execution by the application.

18 Claims, 7 Drawing Sheets

U.S. PATENT DOCUMENTS

| | | | |
|---|---|---|---|
| 5,606,693 A | 2/1997 | Nilsen et al. | |
| 5,613,089 A | 3/1997 | Hornbuckle | |
| 5,619,716 A | 4/1997 | Nonaka et al. | |
| 5,634,107 A | 5/1997 | Yumoto et al. | |
| 5,732,275 A | 3/1998 | Kullick et al. | |
| 5,737,495 A | 4/1998 | Adams et al. | |
| 5,742,829 A | 4/1998 | Davis et al. | |
| 5,757,919 A | 5/1998 | Herbert et al. | |
| 5,764,992 A | 6/1998 | Kullick et al. | |
| 5,808,690 A | 9/1998 | Rich | |
| 5,819,082 A | 10/1998 | Marion | |
| 5,829,001 A | 10/1998 | Li et al. | |
| 5,835,601 A | 11/1998 | Shimbo et al. | |
| 5,850,535 A | 12/1998 | Maystrovsky et al. | |
| 5,862,339 A | 1/1999 | Bonnaure et al. | |
| 5,915,112 A | 6/1999 | Boutcher | |
| 5,924,094 A | 7/1999 | Sutter et al. | |
| 5,926,624 A | 7/1999 | Katz et al. | |
| 5,933,835 A | 8/1999 | Adams et al. | |
| 5,960,189 A | 9/1999 | Stupek, Jr. et al. | |
| 5,970,143 A | 10/1999 | Schneier | |
| 5,982,893 A | 11/1999 | Hughes | |
| 5,999,740 A | 12/1999 | Rowley | |
| 6,009,528 A | 12/1999 | Teraoka | |
| 6,018,717 A | 1/2000 | Lee et al. | |
| 6,029,175 A | 2/2000 | Chow et al. | |
| 6,105,074 A | 8/2000 | Yokote et al. | |
| 6,119,203 A | 9/2000 | Snyder et al. | |
| 6,122,372 A | 9/2000 | Hughes | |
| 6,122,657 A | 9/2000 | Hoffman, Jr. et al. | |
| 6,154,767 A | 11/2000 | Altschuler et al. | |
| 6,195,622 B1 | 2/2001 | Altschuler et al. | |
| 6,219,793 B1 * | 4/2001 | Li et al. | 726/19 |
| 6,223,166 B1 | 4/2001 | Kay | |
| 6,256,773 B1 | 7/2001 | Bowman-Amuah | |
| 6,269,400 B1 | 7/2001 | Douglas et al. | |
| 6,292,889 B1 | 9/2001 | Fitzgerald et al. | |
| 6,314,409 B2 | 11/2001 | Schneck et al. | |
| 6,317,786 B1 | 11/2001 | Yamane et al. | |
| 6,324,578 B1 * | 11/2001 | Cox et al. | 709/223 |
| 6,332,198 B1 | 12/2001 | Simons et al. | |
| 6,338,072 B1 | 1/2002 | Durand et al. | |
| 6,351,775 B1 | 2/2002 | Yu | |
| 6,366,947 B1 | 4/2002 | Kavner | |
| 6,381,742 B2 | 4/2002 | Forbes et al. | |
| 6,397,258 B1 | 5/2002 | Tsuji et al. | |
| 6,430,608 B1 | 8/2002 | Shaio | |
| 6,438,141 B1 | 8/2002 | Hanko et al. | |
| 6,438,559 B1 | 8/2002 | White et al. | |
| 6,453,353 B1 | 9/2002 | Win et al. | |
| 6,466,979 B1 | 10/2002 | Plouffe, Jr. | |
| 6,473,793 B1 | 10/2002 | Dillon et al. | |
| 6,487,455 B1 | 11/2002 | Balasubramanian | |
| 6,505,255 B1 * | 1/2003 | Akatsu et al. | 709/239 |
| 6,578,054 B1 | 6/2003 | Hopmann et al. | |
| 6,578,102 B1 | 6/2003 | Batchelor et al. | |
| 6,584,568 B1 | 6/2003 | Dircks et al. | |
| 6,611,812 B2 | 8/2003 | Hurtado et al. | |
| 6,618,810 B1 | 9/2003 | Dirie | |
| 6,675,382 B1 | 1/2004 | Foster | |
| 6,678,700 B1 | 1/2004 | Moore et al. | |
| 6,684,396 B1 | 1/2004 | Brittain et al. | |
| 6,694,450 B1 | 2/2004 | Kidder et al. | |
| 6,711,593 B1 | 3/2004 | Gordon et al. | |
| 6,718,549 B1 | 4/2004 | Narin et al. | |
| 6,721,786 B1 | 4/2004 | Gordon et al. | |
| 6,735,601 B1 | 5/2004 | Subrahmanyam | |
| 6,738,970 B1 | 5/2004 | Kruger et al. | |
| 6,748,470 B2 | 6/2004 | Goldick | |
| 6,751,608 B1 | 6/2004 | Cohen et al. | |
| 6,752,313 B1 | 6/2004 | Caviles et al. | |
| 6,754,821 B1 | 6/2004 | Berson et al. | |
| 6,766,428 B2 | 7/2004 | Saulsbury et al. | |
| 6,771,290 B1 | 8/2004 | Hoyle | |
| 6,775,704 B1 | 8/2004 | Watson et al. | |
| 6,799,276 B1 | 9/2004 | Belissent | |
| 6,807,542 B2 | 10/2004 | Bantz et al. | |
| 6,829,649 B1 | 12/2004 | Shorey et al. | |
| 6,848,028 B1 | 1/2005 | Sugumar et al. | |
| 6,862,616 B1 | 3/2005 | Tompkins | |
| 6,868,539 B1 | 3/2005 | Travison et al. | |
| 6,871,344 B2 | 3/2005 | Grier et al. | |
| 6,871,345 B1 | 3/2005 | Crow et al. | |
| 6,880,086 B2 | 4/2005 | Kidder et al. | |
| 6,883,168 B1 | 4/2005 | James et al. | |
| 6,895,506 B1 * | 5/2005 | Abu-Husein | 713/193 |
| 6,912,520 B2 | 6/2005 | Hankin et al. | |
| 6,938,005 B2 | 8/2005 | Iverson et al. | |
| 6,950,523 B1 | 9/2005 | Brickell et al. | |
| 6,961,341 B1 | 11/2005 | Krishnan | |
| 6,981,070 B1 * | 12/2005 | Luk et al. | 710/5 |
| 6,986,133 B2 | 1/2006 | O'Brien et al. | |
| 6,996,599 B1 | 2/2006 | Anders et al. | |
| 7,000,230 B1 | 2/2006 | Murray et al. | |
| 7,035,943 B2 | 4/2006 | Yamane et al. | |
| 7,055,027 B1 * | 5/2006 | Gunter et al. | 713/151 |
| 7,058,607 B1 | 6/2006 | Miyawaki et al. | |
| 7,131,111 B2 | 10/2006 | Passanisi | |
| 7,143,143 B1 | 11/2006 | Thompson | |
| 7,243,226 B2 * | 7/2007 | Newcombe et al. | 713/155 |
| 7,350,076 B1 * | 3/2008 | Young et al. | 713/169 |
| 2002/0035526 A1 | 3/2002 | Kutaragi et al. | |
| 2002/0059408 A1 | 5/2002 | Pattabhiraman et al. | |
| 2002/0075844 A1 | 6/2002 | Hagen | |
| 2002/0083178 A1 * | 6/2002 | Brothers | 709/226 |
| 2002/0150253 A1 | 10/2002 | Brezak et al. | |
| 2002/0165026 A1 | 11/2002 | Perkins et al. | |
| 2002/0166117 A1 | 11/2002 | Abrams et al. | |
| 2002/0172222 A1 | 11/2002 | Ullmann et al. | |
| 2003/0009365 A1 | 1/2003 | Tynan et al. | |
| 2003/0039211 A1 | 2/2003 | Hvostov et al. | |
| 2003/0105827 A1 | 6/2003 | Tan et al. | |
| 2004/0177120 A1 | 9/2004 | Kirsch | |
| 2004/0215793 A1 | 10/2004 | Ryan et al. | |
| 2007/0038759 A1 | 2/2007 | Hanson et al. | |

FOREIGN PATENT DOCUMENTS

| | | |
|---|---|---|
| EP | 1150207 | 10/2001 |
| GB | 2348721 | 10/2000 |
| WO | 0161486 | 8/2001 |

OTHER PUBLICATIONS

Rajiv Jauhari et al.: "Priority-Hints: An Algorithm for Priority-Based Buffer Management," Proceedings of the 16th VLDB Conference, Brisbane, Australia, 1990, pp. 708-721.

U.S. Appl. No. 10/317,845, Official Communication mailed Apr. 18, 2008.

European Patent Application No. 02 805 593.7-1244, Official Communication mailed Apr. 15, 2008.

Hochmuth, Phil, F5, CacheFlow pump up content-delivery lines, May 4, 2001, Network World.

USPTO, Notice of Allowance mailed Apr. 3, 2009 in U.S. Appl. No. 10/317,851, 10 pages.

* cited by examiner

ENABLING CONTENT SECURITY IN A DISTRIBUTED SYSTEM

RELATED APPLICATIONS

This application is a continuation patent application of U.S. patent application Ser. No. 10/318,350, filed Dec. 11, 2002, entitled "Method And System For Enabling Content Security In A Distributed System," and claims the benefit under 35 U.S.C. §120, which in turn is based on a previously filed U.S. Provisional Patent application, U.S. Ser. No. 60/341,079 filed on Dec. 12, 2001, the benefit of the filing date of which is hereby claimed under 35 U.S.C. § 119(e), and wherein each of which is further incorporated herein by reference.

FIELD OF THE INVENTION

The present invention relates generally to computers and more particularly to providing secure content over a network.

BACKGROUND OF THE INVENTION

Today, many software providers have recognized the potential cost savings associated with distributing content over the Internet. If the content can be packaged in a small executable, a software provider may choose to distribute the software over the Internet. However, while the Internet provides new opportunity for profits to software providers, it also creates a tremendous risk for piracy of the content. Such risk for piracy may arise at any place that the content is exposed. Without appropriate protection, the content can be illicitly intercepted, stolen, copied, and redistributed, thus depriving software providers of their profits. Therefore, there is a need in the industry for providing content securely over a network. Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to a system and method for providing content securely over a network. In one aspect of the present invention, the system is directed to securing content over a network. The system includes a data store, an update manager, and a content manager. The data store is configured to store content. The update manager is coupled to the data store and configured to change content in the data store at a rate that is directed to frustrating a hacker or thief. The update manager also tags a portion of the content as exclusively memory resident at a client. The content manager is configured to determine if the client is authentic. If the client is authentic, the content manager provides the content to the client at a predetermined rate. Moreover, the tagged portion of the content remains absent from a client's permanent data store thereby reducing theft of the content.

In another aspect of the invention, a method is directed at securing content over a network by receiving a request from a client for content associated with an application. A portion of the content is tagged as exclusively memory resident on the client. If the client is authentic, the method provides the requested content to the client at the predetermined rate. The provided content enables an application to start execution on the client before the content associated with the application is completely provided. Additionally, the tagged portion of the content is enabled to execute on the client, while remaining absent from the client's permanent data store thereby reducing theft of the content.

Additionally, in another aspect of the method, the content is changed at a pre-set or variable rate that necessitates the client to request the changed content to execute the application associated with the content.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
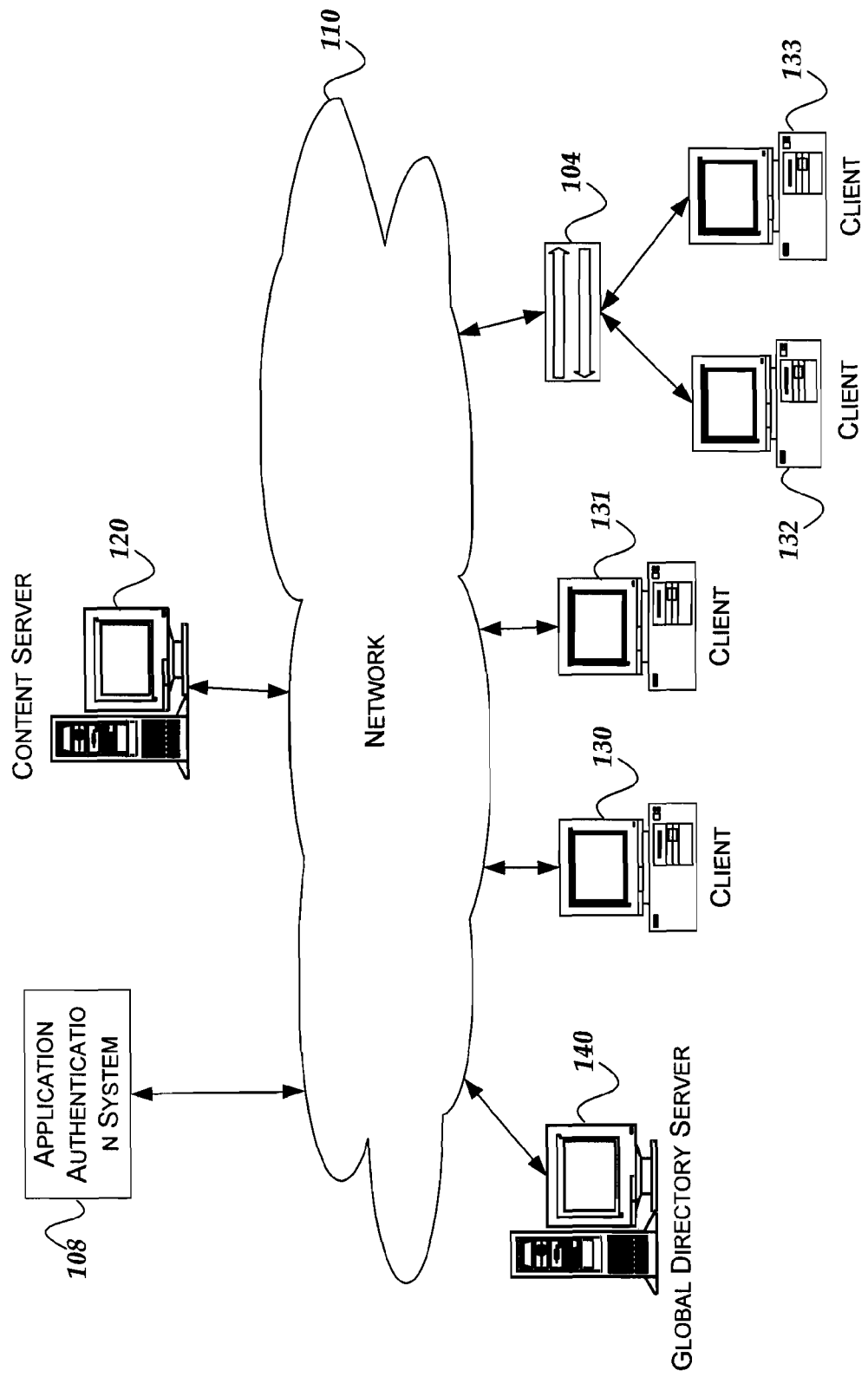
FIG. 1 illustrates a block diagram generally showing an overview of one embodiment in which the invention may be practiced.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Briefly stated, the present invention is directed to a method and system for enabling authentication in a distributed system. The system includes a data store for content associated with an application. The content may be tagged as exclusively memory resident at a client. The content may also be encrypted and digitally signed. When an authenticated client requests the content, the content is provided at a rate that enables a portion of the content to start execution on the client before the application associated with the content is completely provided. Additional portions of the content are provided to the client when the additional portions are required for execution by the application. Moreover, in one embodiment, the content is changed at a rate that includes at least one of a periodic and a non-periodic rate. The changes are directed at necessitating the client to request the changed content to execute the application associated with the content, and thereby further frustrate a potential hacker or thief.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, Blum-BlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++, an open-source class library of cryptographic techniques, the source code of which is hereby incorporated by reference, may be used in encrypting or decrypting applications and/or data. Other encryption and decryption libraries, both open source, commercial, and/or proprietary may be used.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for Secure Hash Algorithm 1. SHA1 is a cryptographic hash algorithm that produces a 160-bit hash value from an arbitrary length string. In other embodiments of the invention, other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in a dictionary. A RSA signature may be created and/or formatted as described in RSA's PKCS #1, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is contained in the CryptoAPI suite, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

Illustrative Environment

FIG. 1 illustrates a block diagram generally showing an overview of one embodiment in which the present invention may be practiced. As shown in the figure, system 100 includes clients 130-133, Network Address Translation (NAT) server 104, content server 120, Application Authentication System (AAS) 108, Global Directory Server (GDS) 140, and network 110. System 100 may include many more components than those shown in FIG. 1. However, the components shown are sufficient to disclose an illustrative embodiment for practicing the present invention.

As further shown in the figure, NAT server 104 is in communication with clients 132-33, and network 110. Clients 130-131, content server 120, AAS 108, and GDS 140 each are in communication with network 110.

Network 110 can employ any form of computer readable media for communicating information from one electronic device to another. Network 110 can include local area networks (LANs), wide area networks (WANs), direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other known links. Furthermore, remote computers and other related electronic devices can be remotely connected to either LANs or WANs via a modem and temporary telephone link. In FIG. 1, it will be appreciated that the network 110 may comprise a vast number of interconnected networks, computers, and routers and therefore only a representative "cloud" is shown.

The media used to transmit information in the links illustrates one type of computer-readable media, namely communication media. Generally, computer-readable media includes any media that can be accessed by a computing device. Communication media typical embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

NAT server 104 provides IP address translations allowing a single device, such as a router, to act as an agent between the Internet (network 110) and a local network (not shown), enabling a single, unique IP address to represent the enterprise. When a NAT enabled device is employed, the IP address space is typically partitioned into two parts—a reusable set of IP addresses internal to stub domains, and a set of globally unique IP addresses. The reusable IP addresses are typically called internal local IP addresses, or local addresses. The global IP addresses are termed global addresses, external address, or remote addresses. A given address is either a local address or a remote address.

NAT server 104 may include a table comprising of pairs of local addresses and remote addresses. The IP addresses inside the stub domain, the local addresses, typically are not globally unique. Therefore, they may be reused in other domains. As the remote IP addresses are used to communicate to the Internet, these addresses typically are globally registered.

AAS 108 is configured to authenticate a user, and to provide the authenticated user one or more content tickets that enables the authenticated user to access one or more content servers. AAS 108 authenticates a user by employing an authentication mechanism that has some features similar to the Kerberos model, which is hereby incorporated by reference. For example, AAS 108 may include an authentication server (not shown) that receives a request for access to content server 120. AAS 108 may also include a ticket-granting server (not shown) that provides one or more content tickets to the authenticated client. However, unlike Kerberos, the present invention also modifies a timestamp with a cryptographically strong digest of the client's local and remote IP addresses before encryption to provide a modified authenticator that binds the timestamp to a particular client.

In one embodiment, AAS 108 extracts the timestamp from the modified authenticator and authenticates the client based at least in part on the timestamp being within an acceptable time window.

AAS 108 may also determine whether another client is attempting to employ an account of the user that is currently logged into a content server, or the like. This may arise for example, when a user shares passwords, account information, or the like, or when a user's information has been stolen, or the like. When AAS 108 determines that the same user appears to be attempting multiple virtually simultaneous logins, AAS 108 may cancel currently authorized tickets issued to that user. It may then contact each content server for which a content ticket was granted and inform the content server that the content ticket is no longer valid.

The AAS 108 may also contact one or more content servers and instruct them to take other actions with respect to a client that attempts to access content with a revoked ticket. For example, the AAS 108 may instruct content server 120 that the client should display a message informing the user that another user is attempting to use tickets the user was previously given, that repeated attempts to obtain or use tickets in this manner may result in suspension of the user's account, and/or other appropriate information. AAS 108 may also instruct content server 120 to modify a download of content provided to the client, such as slowing a rate of transfer of the content to the client, or the like. AAS 108 may further employ other servers, including a message server, or the like, to propagate a message that a certain client and/or tickets should be denied access.

If AAS 108 determines that the client is valid and authorized, it provides the client with the content ticket. In one embodiment, AAS 108 provides several content tickets, each of which is associated with a different content server. The content ticket may include a server readable portion, a client readable portion, and a modified authenticator.

The server readable portion may include information associated with the client's local and remote IP addresses, the user's account, user name, lifetime parameter, a portion of application content, such as a application tile, version information or the like, and a session key. In one embodiment, the server readable portion is signed by a public encryption key associated with AAS 108. Additionally, the server readable portion is encrypted with a public encryption key associated with the receiving content server, such as content server 120. The public/private encryption keys employed may include any of a variety of public/private encryption key mechanisms including those described above.

The client readable portion of the content ticket may include a session key, a lifetime parameter, and the like. The lifetime parameter may include information associated with a time after which the ticket is valid, an expiration time for the ticket, and the like. In one embodiment, the client readable portion is signed with the private key of authentication server of AAS 108 so that clients (who have the corresponding public key) can check that it is valid. The client readable portion may be encrypted with the user's hashed salted password. If the user can decrypt a client readable portion, which is so encrypted, and extract and utilize its contents, then other servers have indirect but firm assurance that the user knows their own password (i.e., is authentic). That is, in one embodiment the client proves that it can decrypt the client readable portion by extracting the session key from the client readable portion and using it to encrypt subsequent authenticators. The authenticators are sent to subsequent servers along with the still-encrypted (opaque) and tamper-proof server readable portion. The server decrypts the server readable portion and extracts its copy of the same session key, and uses that to decrypt the authenticator. If the authenticator is decrypted successfully (and passes checks such as the timestamp check) then this proves beyond reasonable doubt that the client had the correct session key, which proves that the client was able to decrypt the client readable portion (i.e. knows their password).

The modified authenticator includes information associated with the client's local IP address, remote IP address, and timestamp. In one embodiment, the client's local and remote IP addresses are concatenated, and hashed, employing any of the cryptographically strong hashing mechanisms described above, to provide a digest. The digest is exclusive or'ed (xor'ed) with the timestamp. Associating the timestamp with the client's IP addresses ensures that the timestamp is bound to a single physical client, thereby minimizing the likelihood that an authenticator may be reused by a hacker or shared with a friend. In one embodiment, the modified authenticator is further encrypted with the session key to ensure that the client was able to obtain the session key by decrypting the client readable portion that it received. It also confirms that content server 120 is able to obtain the session key by decrypting the server readable portion.

Content server 120 may include virtually any electronic device capable of storing content and downloading the content to an authenticated client. Some devices that may be used as content server 120 include a client such as client 300 of FIG. 3 and a server such as server 200 of FIG. 2.

GDS 140 is configured to provide location information about AAS 108 to clients 130-133 and content server 120. GDS 140 may receive the location information from AAS 108. Location information may include an IP address, a Universal Resource Locator (URL), Media Access Control (MAC) address, and the like.

Clients 130-133 are described in more detail with reference to FIG. 3 below. Briefly, however, clients 130-133 may include virtually any device capable of sending information to or receiving information from network 110. Clients 130-133 include personal computers, multiprocessor systems, microprocessor-based or programmable consumer electronics, network PCs, minicomputers, mainframe computers, and the like. As shown in FIG. 1, clients 132-133 reside behind NAT server 104 such that the local IP addresses assigned to each client may be hidden from the other devices on network 110, such AAS 108. Moreover, clients 130-133 may be assigned its local IP addresses through various mechanisms, including static assignments, dynamic assignments such as Dynamic Host Configuration Protocol (DHCP), and the like.

Clients 130-133 are enabled to request access to servers, such as content server 120 by requesting content tickets from AAS 108. In one embodiment of the invention, clients 130-133 are enabled to provide information associated with its local and remote IP addresses to AAS 108 as part of the request for content tickets. Clients 130-133 may also provide information associated with local and remote IP addresses to content server 120.

Figure 4:
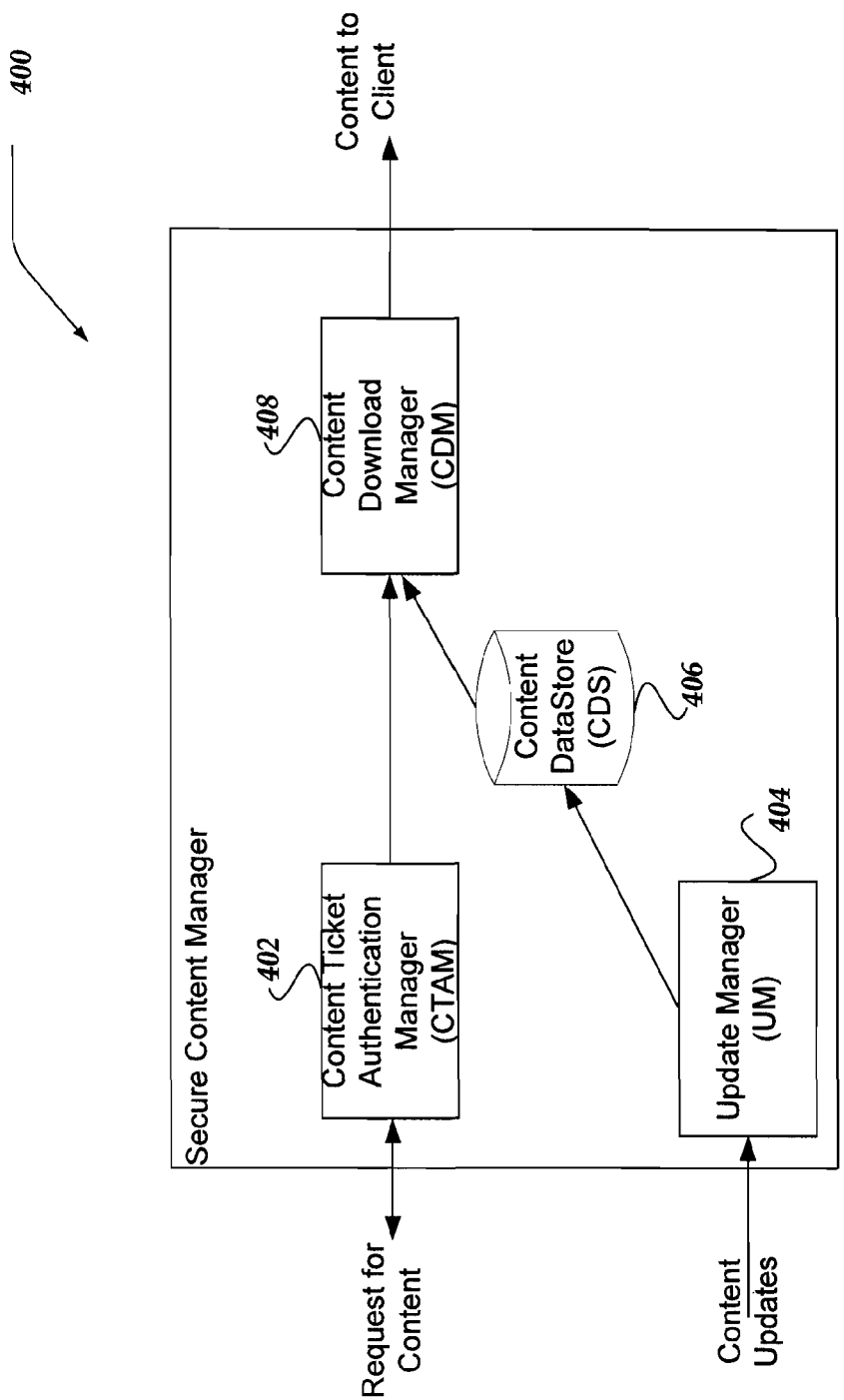
FIG. 4 illustrates a functional block diagram of one embodiment of components of a secure content manager.

FIG. 4 illustrates a functional block diagram of one embodiment of components of a secure content manager for content server 120 shown in FIG. 1, in accordance with the present invention. Briefly, Secure Content Manager (SCM) 400 is configured to determine whether a client requesting content is authentic and authorized to obtain content. SCM 400 is further configured to provide the content to the authenticated and authorized client in a secure manner.

As shown in FIG. 4, SCM 400 includes Content Ticket Authentication Manager (CTAM) 402, Update Manager (UM) 404, Content Data Store (CDS) 406, and Content Download Manager (CSM) 408. System 400 may include many more components than those shown in FIG. 4. However, the components shown are sufficient to disclose an illustrative embodiment for practicing the present invention. As further shown in the figure, CDM 408 is in communication with CDS 406 and CTAM 402. CDS is also in communication with UM 404.

CDS 406 is configured to provide storage for information associated with content. CDS 406 may include a database, a flat file, a directory structure, and the like. Content may include data, application programs, code portions, subroutines, functions, dynamic link libraries, executable components, licensing information, and the like. Content may be compressed, encrypted, or unencrypted. Content may also be digitally signed employing any of a variety of mechanisms, including those described above. Moreover, a version of the content may employ a distinct encryption key. Encryption and signing keys may be stored in a content description data store (not shown) on AAS 108. Decryption and signature verification keys may be sent to a client by embedding them in the client readable portion of the content ticket. Moreover, the content ticket may be cached in a restricted access file that is configured for the particular client, thereby minimizing the usefulness of stolen decryption and signature verification keys.

Content may be divided into one or more resources. Resource may be anything a program requires or needs to continue or complete execution. A program itself may be divided into a plurality of resources. When a client computer first requests an application, the resources of the application may be located solely on a content server, such as content server 120 in FIG. 1. The executable code, data, and the like that comprises the application may both be divided into blocks. Each of these blocks could be considered a resource needed by the application to continue or complete execution.

In one embodiment, content is configured employing various obfuscation and tamper-detection and tamper-prevention techniques. Obfuscation and tamper-detection/prevention includes mechanisms, processes, techniques, and the like that are directed to enhance the security of content by inhibiting the disassembly, decompilation and modification of the content. Any of a variety of dynamic and static obfuscation techniques may be employed, including transformations of content based on a desired level of security (e.g., resistance to reverse engineering); control transformations that create opaque constructs and the like employing aliasing, concurrency; transformations of content based on a desired level of obfuscation (e.g. desired potency, resilience, cost); and the like. In one embodiment, obfuscation includes modification of an application's static symbolic information. In another embodiment, dummy code in integrated at varying locations with the content. In still another embodiment, a checksum formula associated with the content is randomly varied.

Some of the blocks of content may be downloaded from the content server and stored on the client. Blocks of content may be configured to be downloaded at a predetermined or variable rate to a client. That is, after a sufficient number of blocks are downloaded, the application may start executing with the blocks that are currently available on the client computer. Before or when the application comes to a part in the code in which it needs code located on the content server, the application may request a block of code containing the needed code. This block of content would be a resource needed by the application to continue or complete execution. Moreover, the blocks of content may be configured such that not all of the blocks of content associated with a complete application are present on the client computer at any one time. This is directed at ensuring that the complete application is not available for theft at any one time.

Moreover, in one embodiment of the present invention, content in one block is configured to cross validate content in another block. In one embodiment the cross validation is constructed in a hierarchical approach across content. In another embodiment, the cross validation employs a circular validation of content. That is, a block of content may include an executable, dynamic link library or the like that is enabled to validate a digital signature associated with an executable, dynamic link library or the like in another block of content. Thus, an attacker would have to simultaneously remove all such validations from the blocks of content before the associated application could run without potentially detecting that it has been tampered with and instituting a countermeasure. Such countermeasures may include degradation of performance of the application on a client, reporting the tampering to an authority, termination of access to the application, termination of an account associated with a user, and the like.

Associated with the blocks of content may also be a checksum block. The checksum block provides integrity information associated with the blocks of content. The checksum block may also be in a compressed, encrypted, or unencrypted format. Additionally, the checksum block may be digitally signed employing any of a variety of mechanisms, including those described above.

Also associated with the content may be a tag that indicates that the content is exclusively memory resident at the client. That is the tagged content is configured to never be cached to a permanent data store, including a hard disk, floppy disk, CD, tape, DVD, or the like. Content tagged as "exclusively memory resident" is intended to be downloaded to a client's random access memory (RAM) or the like, decrypted in memory, loaded, and executed in memory by application programs on a client that are further configured to restrict access to portions of tagged content. In addition, the tagged content may be configured to be purged off of the client upon a predetermined condition, including completion of execution of the tagged content by the client, an application associated with the content, or the like.

UM 404 is configured to receive frequent changes of the content with associated version identifiers and provide the revised content to CDS 404. Frequent changes of content are directed at further frustrating potential content theft by requiring a hacker to frequently request the content. In one embodiment, at least a portion of the content is revised at least once per minute. However, other portions of the content may be changed at a different revision rate, including a periodic rate, a non-periodic rate, and the like. Moreover, UM 404 is directed to provide selected content as content that is tagged as "exclusively memory resident at the client."

CTAM 402 is configured to receive requests for content from clients 130-133. CTAM 402 receives requests typically in the form of a content ticket that was granted by AAS 108. The content ticket may include a client readable portion, a server readable portion, and a modified authenticator, as described above.

CTAM 402 examines information in and about the server readable portion of the content ticket to authenticate the client. For example, it may examine a digital signature associated with the server readable portion to validate the source and integrity of the server readable portion. CTAM 402 may also decrypt the readable portion employing its private encryption key. Moreover, it may employ the session key to decrypt the modified authenticator. CTAM 402 may then 'exclusive or' the modified authenticator with a concatenated cryptographically strong digest of the client's local and remote IP addresses. CTAM 402 may obtain the client's remote IP address from the TCP/IP packet header, a system call, or the like. CTAM 402 may obtain the client's local IP address from the server readable portion of the content ticket. Should either of the IP addresses not match the IP addresses employed to originally generate the modified authenticator then, a resulting timestamp would likely be incorrect. It would be extremely unlikely then that the resulting timestamp would fall within an acceptable time window. Hence, the client would be determined to be an unauthorized client and may be denied access to content.

In a traditional approach, detection of reused authenticators is performed by maintaining a record of all authenticators (and pre-authenticators) received within a prior pre-set period of time. The examining server would compare a received authenticator to the stored authenticators in the prior pre-set period of time. If a match is found, than the examining server would assume the authenticator is being reused by an unauthorized client. However, this approach may result in a significant load on the examining server, slowing down the authentication and access process.

This problem is addressed by binding the authenticator to a physical client through the IP addresses. However, as an IP address may be misleading for clients residing behind a NAT server, the present invention stores those authenticators for further examination. That is, if CTAM 402 determines that the client's local IP address is not the same as the client's remote IP address, then CTAM 402 compares the received authenticator to the stored authenticators for a possible reuse of authenticators. By only performing this comparison for clients behind a NAT server, the present invention may greatly reduce the need to check pre/authenticators for possible reuse. In addition, even if the client is behind a NAT its pre/authenticators are still bound to one particular combination of remote and local IP addresses. This means that the server need only check the timestamp against a small set of pre/authenticators previously received from that one client (that combination of IP addresses) within the time window. This is typically a much smaller set than the global set of all pre/authenticators received from all clients within the time window (which a traditional Kerberos approach checks against).

CTAM 402 also examines the client's remote and local IP addresses to determine whether other users are attempting to share the user's account. By requiring the client to provide its IP addresses, the present invention may also minimize the effects of a network address translation described above.

Moreover, CTAM 402 extracts the client's remote IP address from a TCP/IP packet header associated with the client's request, a system call, or the like, and also obtains the client's remote IP address from the server readable portion (i.e. as the remote IP address was seen by the server that issued the ticket containing this server readable portion). CTAM 402 may then compare the two remote IP addresses to further validate the client. Note that the two addresses may legitimately be different if the client's remote IP address has changed for any reason since the ticket (server readable portion) was issued. For example, this may occur if the client has a dynamic IP address (DHCP), which has expired, or if the client is behind a NAT that has a dynamic IP address, which has expired. In any case, if the remote IP addresses are different (even for these legitimate reasons) then the client fails authentication and must obtain a new ticket (new server readable portion) from the issuing server to confirm the client's new remote IP address. This is done because the server cannot generally distinguish between legitimate client IP address changes and theft of tickets (use of tickets from a hacker's IP address, different from that of the original client).

CTAM 402 also examines other parameters to validate the client, including the lifetime parameter, session key, user name, account name associated with the user, access rights granted, content being requested, and the like. CTAM 402 may also receive messages from AAS 108 informing it that the client is not authentic, and hence should be denied access to content.

Should CTAM 402 determine that a client is not authentic, or is not authorized, CTAM 402 may deny the client access to the requested content. CTAM 402 may also send an error message to the client informing the user that access to the requested content is denied. In one embodiment, CTAM 402 directs CDM 408 to slow or even stop content flow to the unauthenticated client.

Alternatively, if CTAM 402 determines that the client is authentic and authorized, CTAM 402 may provide a signal, message, or the like, to CDM 408 to enable the client to access the requested content.

Also, if CTAM 402 determines that the client is authentic but already has a connection to access content, then CTAM 402 may refuse access, or may direct CDM 408 to grant access but also disconnect the client's existing connection. This is directed at preventing multiple simultaneous accesses to content by a single user—i.e. to prevent users from sharing their account names and passwords with third parties.

CDM 408 is configured to provide content with its associated checksum blocks to the authorized and authenticated client. Content is typically downloaded to the client employing a predetermined rate of content transfer to the client. That is, content may be downloaded in a stream of blocks that are arranged to enable the client application to start execution in the client memory with the blocks that are currently available on the client computer. Before or when the application comes to a part in the code in which it needs code located on the content server, the application may request a block of code containing the needed code to be downloaded. Moreover, CDM 408 may ensure that not all of the application associated with the content is present on the client at any one time to ensure that the complete application is not available for theft on the client. In one embodiment, CDM 408 may direct the client to be re-authenticated before receiving the additional content.

In another embodiment, CDM 408 or another server is configured to provide an additional stream of bits that may include a pseudo-random sequence (using a pre-arranged or communicated seed), a decryption key, a signature verification key, application data, content, or the like. This stream of bits is required to ensure the proper execution of an associated application (i.e. is another mechanism to ensure that the client never has a full set of bits required to run the application, and so cannot use the application without being connected and authenticated by the system). For example, the client may be required to perform an action, such as a one-way hash, based in part on data extracted at pre-selected points in the stream of bits, and verify that the hashes match a pre-arranged table, or the like. The one-way hash of the stream of bits may also be employed by an algorithm within the application such that an incorrect one-way hash would cause the application to malfunction, degrade, report an error, or the like. In this manner, an attacker may be prevented from merely regenerating the stream of bits by employing the same algorithm, seed, and the like.

CDM 408 is further configured to receive messages, instructions, and the like, from CTAM 402 directing CDM 408 to modify a rate of download to a client. In one embodiment, CDM 408 is instructed to slow the rate of download to the client. In another embodiment, CDM 408 is instructed to stop the download, perhaps because the client is no longer authorized to access the content.

Figure 2:
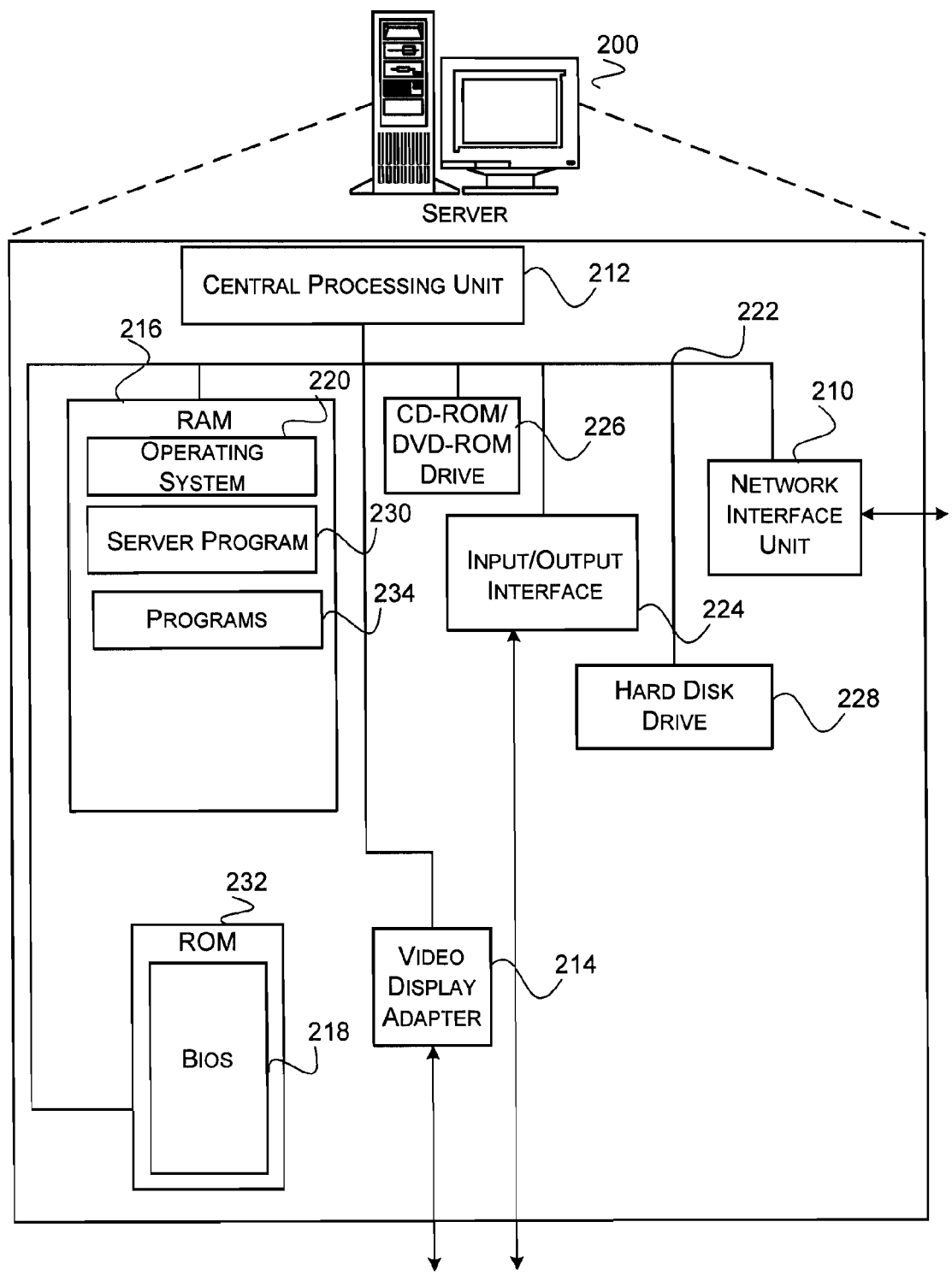
FIG. 2 illustrates a functional block diagram of one embodiment of a server as shown in FIG. 1.

FIG. 2 illustrates a functional block diagram of one embodiment of a server, such as NAT server 104, and content server 120, or the like, as shown in FIG. 1. Server 200 may include many more components than those shown in FIG. 2. However, the components shown are sufficient to disclose an illustrative embodiment for practicing the present invention.

As shown in figure, server 200 may be connected to network 110, or other communications network, via network interface unit 210. Network interface unit 210 includes the necessary circuitry for connecting server 200 to network 110, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. This component may comprise a general-purpose server operating system, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, applications, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site, application server site, authentication site, or the like. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by application servers, content servers, and the like. For example, customer databases, product databases, image databases, and relational databases may be stored.

Figure 3:
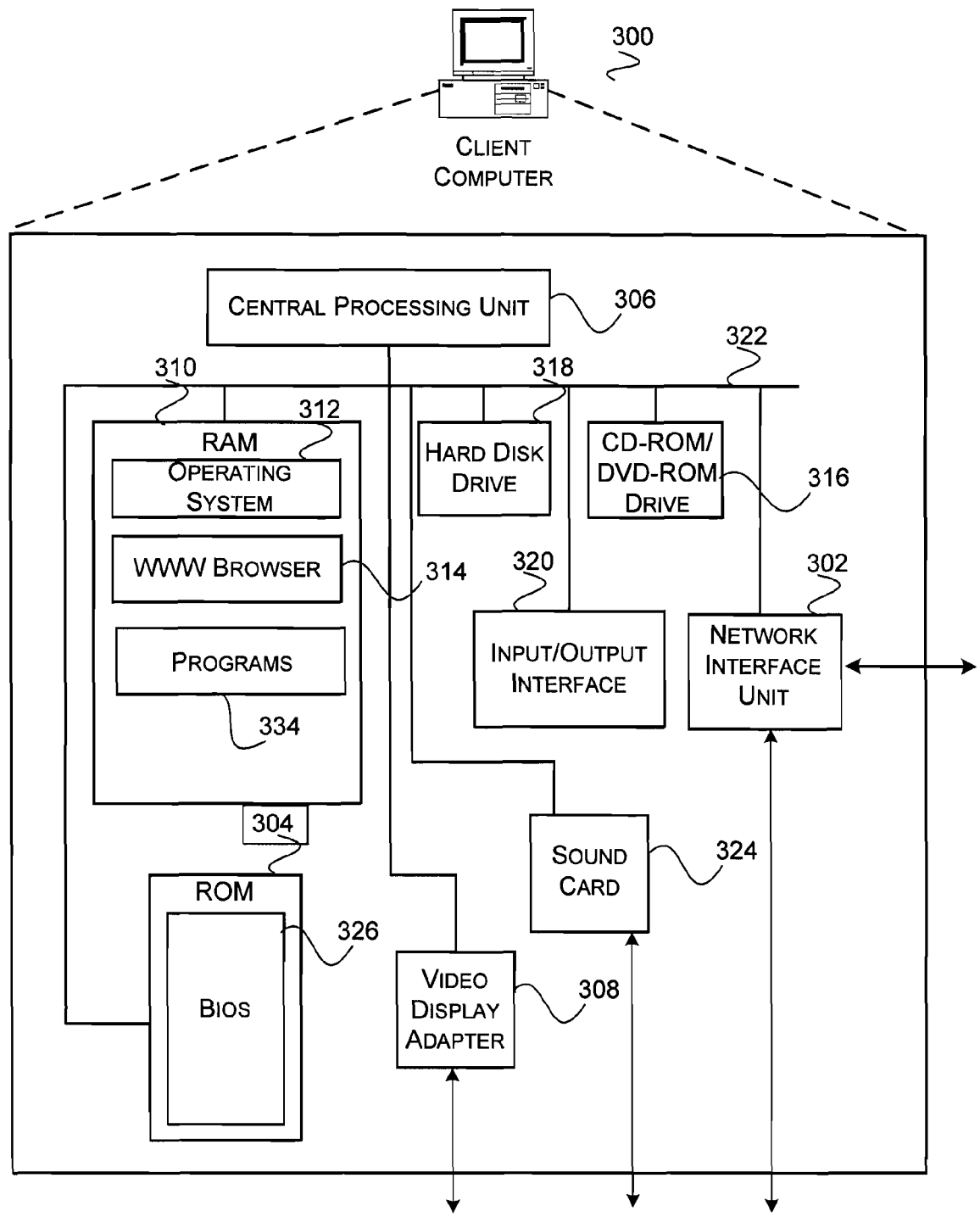
FIG. 3 illustrates a functional block diagram of one embodiment of a client as shown in FIG. 1.

FIG. 3 illustrates a functional block diagram of one embodiment of a client computer as shown in FIG. 1. Client computer 300 may include many more components than those shown in FIG. 3. However, the components shown are sufficient to disclose an illustrative embodiment for practicing the present invention.

As shown in FIG. 3, client computer 300 includes network interface unit 302 for connecting to a LAN or WAN, or for connecting remotely to a LAN or WAN. The network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300, and enabling a user to request access to a server, to play applications, and the like. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

Generalized Operation

Figure 5:
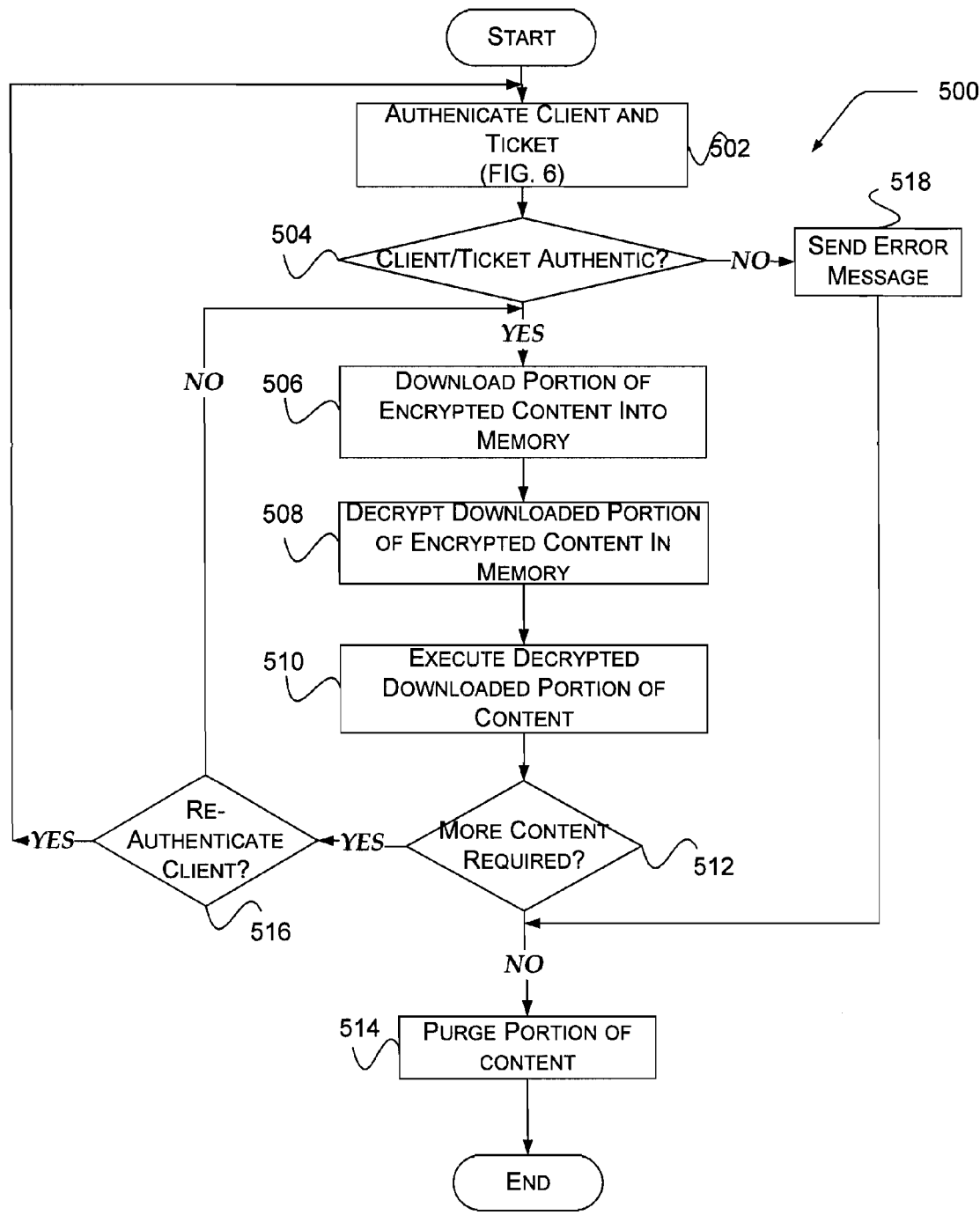
FIG. 5 illustrates a flow diagram generally showing one embodiment of a process for securing content over a network.

The operation of certain aspects of the present invention will now be described with respect to FIG. 5 for providing secure content over a network, in accordance with the present invention.

After a start block, process 500 begins at block 502, where a client requesting content is authenticated. Process 500 may be entered for example, when the client is instructed that an update to content is required to execute an application. Frequent updates to the content are directed to requiring the client to be authenticated. Typically, a client to be authenticated provides a content ticket that was granted by another process, such as a content ticket-granting process (not shown), or the like.

Figure 6:
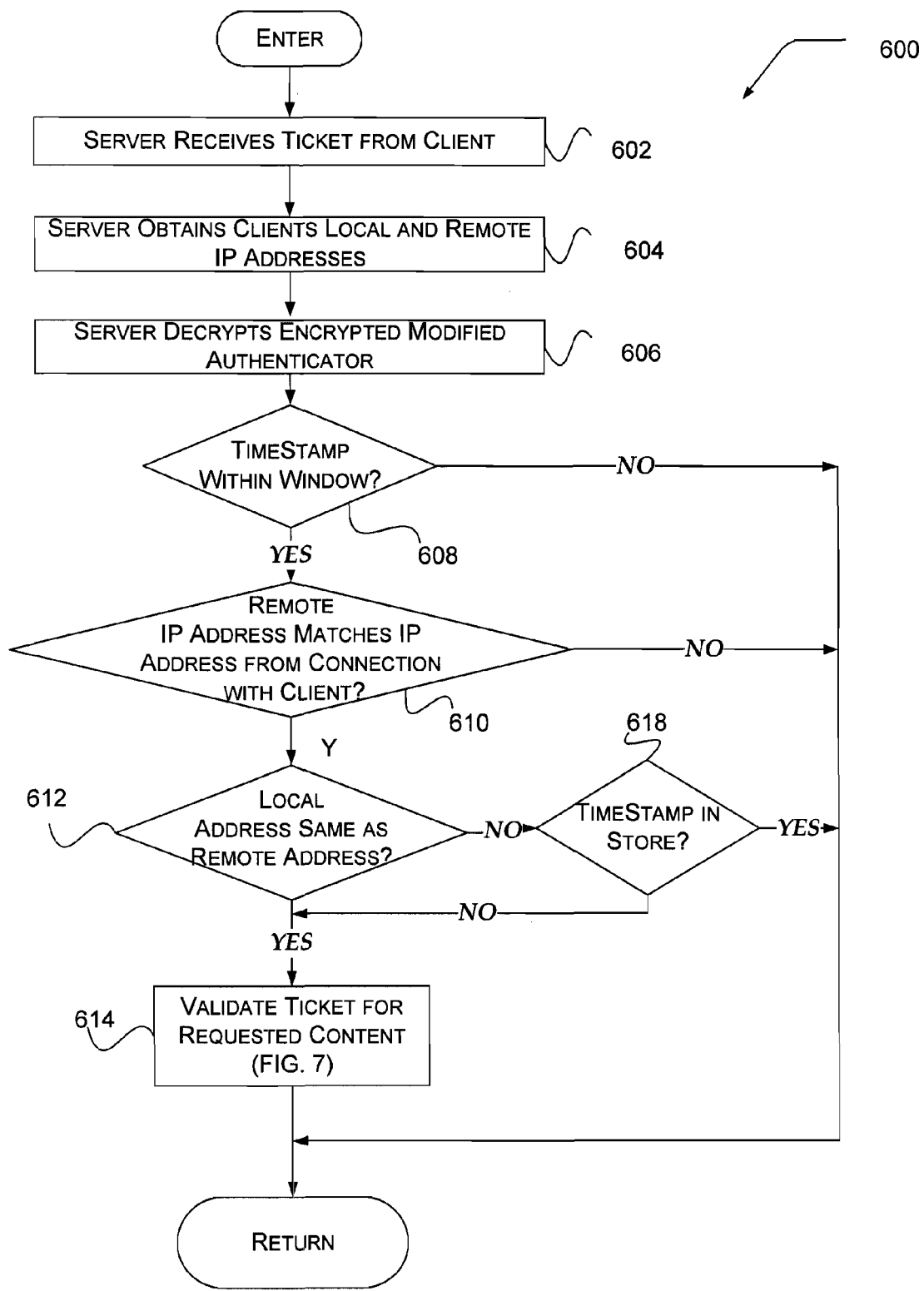
FIG. 6 illustrates a flow diagram generally showing one embodiment of a process for authenticating a client.

At block 502, a content server examines the content ticket provided by the client to determine whether the client is authentic and authorized to access the requested content (see FIG. 6).

Processing moves next to decision block 504, where a determination is made whether the client is authenticated and authorized. If the client is deemed not to be authentic or authorized, processing flows to 518 where an error message is sent to the client. Processing then flows block 514.

Alternatively, if, at decision block 504, the client is determined to be authentic and authorized to access the requested content, processing continues to block 506. At block 506, the requested content is downloaded to the client. In one embodiment, content that is tagged as exclusively memory resident is downloaded into the client's memory. Moreover, the requested content may be downloaded at a constrained rate of transfer to the client.

Processing proceeds to block 508 where downloaded content is decrypted and its checksums are evaluated to ensure that the downloaded content has not been modified. Moreover, in one embodiment, at block 508, digital signatures associated with the content, and checksum blocks are examined to ensure the content is authentic. Should it be determined that the content has been modified, the associated application may be configured to not execute. Moreover, the associated application may also be configured not to execute if the content indicates that a revision is required.

Process 500 continues to block 510 where authenticated content is executed by the client. Processing flows to decision block 512, where a determination is made whether the client requires more content to continue execution of the application. If it is determined that more content is required, processing flows to decision block 516, otherwise, the processing continues to block 514.

At decision block 516, a determination is made whether the current client is to be re-authenticated. If the client is to be re-authenticated, processing returns to block 502, to perform substantially the same process as described above. Alternatively, if the client is not to be re-authenticated, processing returns to block 506, to perform substantially the same process as described above.

If no more content is required by the client, processing continues to block 514. At block 514, when it is determined that the client is no longer executing the downloaded application, the application is configured to purge selected content from the user's computer. This is directed at minimizing potential theft of the content and requiring the user to be re-authenticated to the content server. Upon completion of block 514, process 500 ends.

FIG. 6 illustrates a flow diagram generally showing one embodiment of a process for authenticating a client, in accordance with the present invention.

After a start block, process 600 begins at block 602 where the server receives the content, including an encrypted modified authenticator, is received. In one embodiment, the content server may cache the content ticket to minimize requests from the client.

Processing continues to block 604, where the client's local and remote IP addresses are obtained. In one embodiment, the client's remote IP address is obtained by examining a TCP/IP packet header associated with the client. The client's local IP address may be obtained from the client's request for authentication.

Process 600 continues to block 606, where the encrypted modified authenticator is decrypted. In one embodiment, the modified authenticator is decrypted employing a session key that was encrypted in the server readable portion of the content ticket. In addition, at block 606, the client's local and remote IP addresses are concatenated and hashed to obtain a value X. In one embodiment, value X is truncated to a 64-bit value. The value X is then exclusive or'ed with the modified authenticator to obtain a timestamp associated with the client. Processing flows to decision block 608.

At decision block 608, a determination is made whether the timestamp obtained at block 606 is within a time window established by the content server. If the timestamp is outside the time window, client is deemed not to be authentic, and the process returns to block 502 in FIG. 5 to perform other actions. Alternatively, if the timestamp is within the time window, processing continues to decision block 610.

At decision block 610, a determination is made whether a remote IP address associated with information provided by the client matches an IP address obtained by a variety of other approaches, including a system call, examination of a TCP/IP packet associated with the client, and the like. If it is determined that the client's provided remote IP address does not match the IP address obtained through another approach, then it is assumed that the modified authenticator is being reused improperly. The client is deemed not authentic and process 600 returns to block 502 in FIG. 5 to perform other actions.

Alternatively, at decision block 610, if it is determined that the remote IP address provided by the client matches the IP address obtained by another approach, then the process flows to decision block 612.

At decision block 612, a determination is made whether the client's local IP address is the same as the client's remote IP address. If the addresses are different, then it is determined that the client is behind a NAT server, and processing continues to decision block 618. Alternatively, processing continues to 614.

At decision block 618, a determination is made whether the timestamp obtained at block 606 above matches a stored timestamp associated with the client. Stored timestamps may be obtained through communications with the client over a prior pre-set period of time. By only examining stored timestamps for clients behind a NAT server, authentication time and storage space may be minimized over other approaches that always examine the stored timestamps.

If, at decision block 618, it is determined that there is a match with the stored timestamp, the client is determined to be attempting to improperly reuse the timestamp, and is therefore deemed not authentic. Processing returns to block 502 in FIG. 5 to perform other actions.

Alternatively, if the timestamp does not match a stored timestamp associated with the client, the client is deemed authentic and processing flows to block 614.

Figure 7:
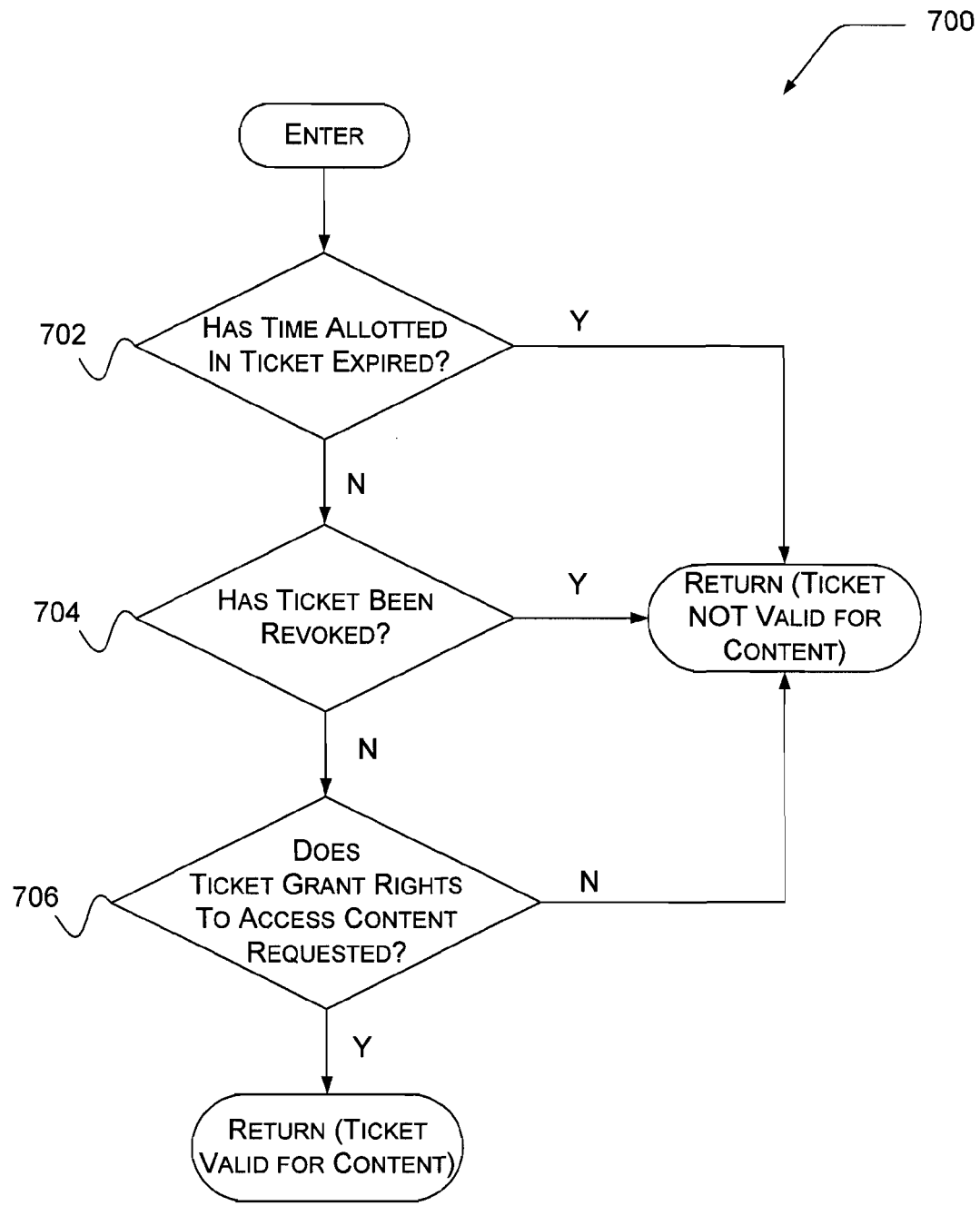
FIG. 7 illustrates a flow diagram generally showing one embodiment of a process for validating a ticket for the requested content, in accordance with aspects of the invention.

At block 614, the content ticket is validated with respective to the requested content (see FIG. 7). Upon completion of block 614, processing returns to block 502 in FIG. 5 to perform other actions.

FIG. 7 illustrates a flow diagram generally showing one embodiment of a process for validating a ticket for the requested content, in accordance with aspects of the invention.

After an enter block, process 700 begins at decision block 702 where a determination is made whether the time allotted for the content ticket, as described by the lifetime parameter, has expired. If the time allotted for the content ticket is expired, then the content ticket is deemed invalid, and process 700 returns to block 613 in FIG. 6, to perform other actions.

Alternatively, if at decision block 702, the time allotted is not expired, the process continues to decision block 704, where a determination is made whether the content ticket is revoked. A revocation may arise, for example, when the client is determined to be unauthenticated by another server, such as the ticket-granting server, which has informed the content server that the ticket is revoked. Revocation may also arise, where the content server has determined that there is an attempt to reuse this same content ticket. If it is determined that the ticket is revoked, the content ticket is deemed invalid, and processing returns to block 614 in FIG. 6, to perform other actions.

Alternatively, if at decision block 704, the content ticket is not revoked, processing continues decision block 706, where a determination is made whether the content ticket includes information that grants the client access to the content requested. If the content ticket does not include information to grant access to the requested content, the content ticket is deemed invalid. Otherwise, the content ticket is deemed valid. Upon completion of decision block 706, processing returns to block 614 in FIG. 6, to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A system for securing content over a network, comprising:
   a client device configured and arranged to receive content, comprising:
      a memory component that is arranged for temporal content storage; and
      a permanent-memory based storage component that is arranged for non-temporal content storage; and
   a secure content manager that is configured to perform actions, including:
      receiving a first portion of content of an application that is tagged to be exclusively memory resident at the memory component of the client device;
      receiving a second portion of the content of the application that is untagged, such that the second portion is enabled to be stored on the client device's permanent-memory based storage component;
      receiving a request for the content from the client device, wherein the request includes an authenticator associated with the client device, the authenticator determining if the client is authentic by:
         determining a remote address and a local address associated with the client device,
         concatenating the determined remote address and the local address,
         determining a digest based on the concatenation,
         determining a timestamp based on the digest and the authenticator, and employing the timestamp to determine whether the client device is authentic;
if the client device is authentic based, in part, on the authenticator:
providing, over the network, at least the first portion of the content and the second portion of the content to the client device, wherein the first portion of the content is exclusively memory resident at the memory component on the client device, and the second portion of the content is storable on the client device's permanent-memory based storage component;
receiving, in response to a change in the content, another request from the client device for another portion of the content that is required for continued execution of the application at the client device; and
providing, over the network, the other portion of the content to the client device.

2. The system of claim 1, wherein if the client device is authentic further comprises:
employing at least one IP address associated with the client device to determine a digest;
combining the authenticator with the digest to generate a timestamp; and
examining a value of the timestamp to determine whether the value is within a window of time.

3. The system of claim 1, wherein an executable third portion of content associated with an application is absent from the client during execution of the application on the client device.

4. The system of claim 1, wherein the secure content manager is configured to perform actions, further including:
receiving at least one of the client device's local address, or the client device's remote IP addresses from other than the client device.

5. The system of claim 1, wherein the first portion of content is further configured to be purged from the memory component of the client device upon a completion of execution of the first portion.

6. The system of claim 1, wherein if the client device is authentic further comprises:
performing a request for a first remote address associated with the client device;
examining a packet header associated with the request for content to determine a second remote address; and
determining, in part, that the client device is authentic if the first remote address and the second remote address match.

7. The system of claim 1, wherein if the client device is authentic further comprises:
receiving a content ticket associated with the request for content;
invalidating access to the requested content if at least one of the following conditions exists: a time allocated to the content ticket is expired, the content ticket is revoked, or content ticket fails to grant access rights to the requested content.

8. A method of securing content over a network, comprising:
tagging a first portion of content to be exclusively memory resident at a memory component arranged for temporal content storage at a client device;
determining a second portion of the content to be untagged, such that the second portion is enabled to be stored on the client device's permanent data store device;
receiving a request for the content from the client device, wherein the request includes an authenticator associated with the client device;
determining if the client device is authentic based on the authenticator; and
if the client device is authentic, providing, over the network, at least the first portion of the content and the second portion of the content to the client device, wherein the first portion of the content is loaded exclusively as memory resident on the memory component of the client device, and the second portion of the content is loaded on the client device's permanent data store device,
wherein determining if the client is authentic further comprises:
determining a remote address and a local address associated with the client device;
concatenating the determined remote address and the local address;
determining a digest based on the concatenation;
determining a timestamp based on the digest and the authenticator; and
employing the timestamp to determine whether the client device is authentic.

9. The method of claim 8, wherein the client device's permanent data store device comprises at least one of a hard disk, floppy disk, CD, tape, or DVD.

10. The method of claim 8, wherein the first portion of content is further configured to be purged from the memory component of the client device upon a completion of execution of the first portion.

11. The method of claim 8, further comprising:
receiving a content ticket associated with the request for content; and
inhibiting access to the requested content if at least one of the following is valid: a time allotted to the content ticket is expired, the content ticket is revoked, or the content ticket fails to include information granting access rights to the client device for the requested content.

12. The method of claim 8, wherein the request for content further comprises:
receiving a content ticket that includes at least one of a client device's local address, client device's remote address, or a session key.

13. The method of claim 8, wherein receiving the request for content further comprises:
receiving a content ticket having a client readable portion, a server readable portion and a modified authenticator.

14. A computer-readable storage medium having executable instructions for performing the method of claim 8.

15. An apparatus for securing content over a network, comprising:
memory for storing data and instructions; and
a processor that includes instructions for executing the instructions to perform actions, including:
receiving a request for content from a client device having a permanent data storage component;
tagging a portion of the content to be exclusively memory resident on a memory component arranged for temporal content storage at the client device, while another portion of the content remains untagged such that the other portion is configured to be storable on the permanent data storage component;
receiving a content ticket that includes an authenticator;
employing the content ticket and the authenticator to determine whether the client device is allowed access to the requested content; and if the client device is allowed access, providing, over the network, the tagged portion of the content and the untagged other portion of the content to the client device, wherein the tagged portion of the content is loaded as exclusively memory resident on the memory component of the client device, while the untagged other portion of the content is loadable on the client device's permanent data storage component, wherein employing the authenticator to determine whether the client device is allowed access further comprises:

determining a remote address and a local address associated with the client device;

concatenating the determined remote address and the local address;

determining a digest based on the concatenation;

determining a timestamp based on the digest and the authenticator; and employing the timestamp to determine whether the client device is authentic.

16. The apparatus of claim 15, wherein employing the content ticket to determine whether the client device is allowed access further comprises:

allowing access if at least one of the following is valid: a time allotted to the content ticket is expired, the content ticket is revoked, or the content ticket fails to include information granting access rights to the client device for the requested content.

17. The apparatus of claim 15, wherein receiving a content ticket that includes an authenticator further comprises:

decrypting a server portion of the content ticket to extract a session key; and employing the session key to decrypt the authenticator.

18. The apparatus of claim 15, wherein the content further comprises blocks of content that are arranged such that a first block is useable to cross validate another block of content by employing in the first block at least one of an executable or dynamic link library to validate a digital signature associated with the other block of content.

* * * * *